May 19, 1925.

W. F. LONG

FRUIT JAR WRENCH

Filed July 11, 1923

1,538,642

Inventor
William F. Long.
By Frank E. Liverance
Attorney.

Patented May 19, 1925.

1,538,642

UNITED STATES PATENT OFFICE.

WILLIAM F. LONG, OF GRAND HAVEN, MICHIGAN.

FRUIT-JAR WRENCH.

Application filed July 11, 1923. Serial No. 650,745.

*To all whom it may concern:*

Be it known that I, WILLIAM F. LONG, a citizen of the United States of America, residing at Grand Haven, in the county of Ottawa and State of Michigan, have invented certain new and useful Improvements in Fruit-Jar Wrenches; and I do hereby declare the following to be a full, clear, and exact description of the invention, such as will enable others skilled in the art to which it appertains to make and use the same.

This invention relates to improvements in fruit jar wrenches for the purpose of gripping the fruit jar top to tighten the said top on the jar or loosen it therefrom.

The principal objects of the invention are to provide a device of the character which may be simply and cheaply manufactured, which will be strong in its gripping action and easy to operate and which will be easy to locate upon the fruit jar cover in the correct position to grip the same, and the device is provided with various novel features of construction and arrangement as hereinafter more fully described and particularly pointed out in the claims, reference to be had to the accompanying drawing in which:

Like numbers refer to like parts in all of the figures.

Figure 1:
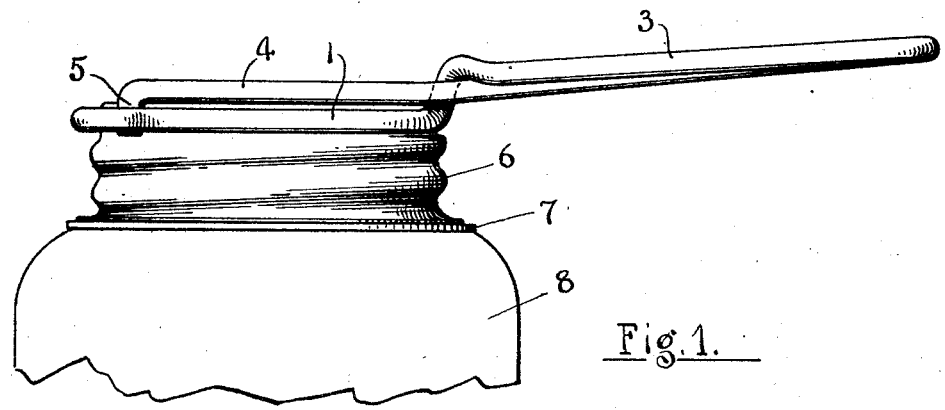
Fig. 1 is an elevation of the top part of the fruit jar with the screw threaded cover thereon, showing a wrench embodying this invention in operative position upon the cover.
Figure 2:
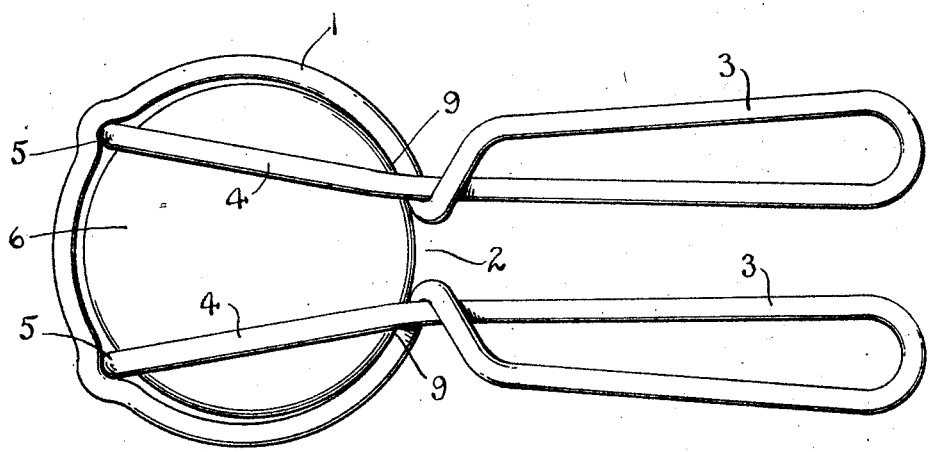
Fig. 2 is a plan view of the wrench in operative position on the cover.
Figure 3:
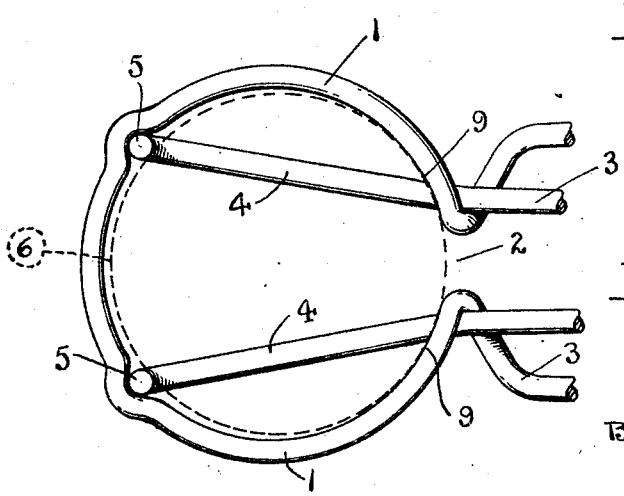
Fig. 3 is an inverted plan view of the wrench with the handle portion broken away.

The wrench is made of a single piece of heavy wire which is formed into a substantially circular body portion 1 of the proper size to fit over the top of the fruit jar cover, a gap 2 being left in the circle and the wire extending from each side of the gap is bent outward extending a short distance and each strand is thence turned inward to form the two spaced apart handle members 3, and the inwardly extending strands are passed over the body portion 1 near the gap 2 therein and are thence extended as chords 4 across said body portion and the extreme ends 5 of the wire are turned downward inside of the body portion 1 and terminate substantially on a level with the lower side of said body portion.

6 represents the fruit jar cover, 7 the rubber packing ring usually used beneath the lower edge thereof and 8 represents the fruit jar usually of glass which has a screw threaded neck corresponding with the screw threads on the cover 6. The standard type of fruit jar cover has a narrow portion above the screw threads thereon which should be gripped by the fruit jar wrench to avoid denting and damaging the threaded portion thereof. The chord members 4 of the wrench extending across the circular body member and above the plane thereof properly locate the wrench when brought down over the top of the cover so that the body member 1 will grip the said narrow portion of the cover above the threads. In this way no damage can be done by gripping and squeezing the threaded portion of the cover.

The down turned end portions 5 serve as gripping points at two spaced apart positions on the cover and the body portion 1 when squeezed together by gripping the handle members 3, engages the cover approximately at the points 9. This gives a 4 point gripping contact which is desirable in that the end points 5 will be drawn very tightly against the cover, possibly slightly denting it and will prevent slippage of the wrench when it is turned to either tighten or loosen the cover.

The circular body portion 1 is normally slightly larger than the top of the cover and may be easily placed thereon and the resiliency of the wire is sufficient to return it to its normal diameter when the handles are not compressed.

I claim:

1. A fruit jar wrench formed of a single piece of material comprising a substantially circular body portion having a gap therein and thence extended outwardly at both sides of the gap and returned to form handle members and thence extending as chords across the circular body portion in a plane slightly above the same to form locating members substantially as described.

2. A fruit jar wrench having a substantially circular compressible body portion, means for compressing the same, members extending as chords across said body portion and in a plane above the same, said members having their ends turned downwardly inside the body portion to provide gripping contact points.

3. A fruit jar wrench made of a single piece of wire including a substantially circular body portion with a gap therein and extended outward at both sides of the gap and thence backward toward the body portion and across said body portion and in a plane slightly above the same the ends of said piece of wire having parts turned downward inside the body portion to form gripping contact points near one side of the body portion opposite the gap.

In testimony whereof I affix my signature.

WILLIAM F. LONG.